United States Patent [19]
Bourne

[11] 3,971,359
[45] July 27, 1976

[54] LOUVERED SELECTIVE SOLAR ENERGY COLLECTOR

[76] Inventor: Richard Curtis Bourne, 1820 B St., Lincoln, Nebr. 68502

[22] Filed: Apr. 14, 1975

[21] Appl. No.: 567,844

[52] U.S. Cl. .............................................. 126/270
[51] Int. Cl.² ........................................... F24J 3/02
[58] Field of Search ............. 126/270, 271; 237/1 A

[56] References Cited
UNITED STATES PATENTS

| | | | |
|---|---|---|---|
| 2,288,465 | 6/1942 | Knudsen ............................ | 126/270 |
| 2,595,905 | 5/1952 | Telkes................................. | 126/270 |
| 2,625,930 | 1/1953 | Harris ................................. | 126/270 |
| 2,680,437 | 6/1954 | Miller ................................. | 126/270 |
| 2,857,634 | 10/1958 | Garbade et al. ..................... | 126/270 |
| 2,918,709 | 12/1959 | Corcoran ............................ | 126/270 |
| 3,102,532 | 9/1963 | Shoemaker ......................... | 126/270 |
| 3,863,621 | 2/1975 | Schoenfelder ...................... | 126/270 |

OTHER PUBLICATIONS
American Society of Heating, Radiation and Aircondi-tioning Engineers (ASHRAE), 1974, Applications Handbook, Chapter 59, pp. 59.1–59.20.

*Primary Examiner*—Carroll B. Dority, Jr.
*Attorney, Agent, or Firm*—Stevens, Davis, Miller & Mosher

[57] ABSTRACT

A flat plate solar air heater for installation between light frame structural members, which comprises a pan of sheet stock such as sheet metal with one or more substantially transparent surface sheets to admit solar radiation into a sealed chamber between said pan and the transparent sheets. A louvered structure placed behind the transparent surface sheets reflects high angle solar rays in summer yet admits low angle solar rays in winter into the black-surfaced absorbing chamber. The louvered structure also increases heat transfer to an air stream moving through the chamber, and directs most of the air flow against the absorber surface. The top and bottom of the pan may be chamfered to permit various ductwork connections.

5 Claims, 3 Drawing Figures

LOUVERED SELECTIVE SOLAR ENERGY COLLECTOR

BACKGROUND OF THE INVENTION

This invention relates in general to the collection of solar energy, and more particularly to arrays of panels for heating air by trapping heat from the sun under sheets of glass or other substantially transparent sheet material. Heated air may then be circulated to warm occupied spaces in buildings, for drying purposes, or stored for later use.

The growing awareness of fossil fuel shortages has sparked renewed interest in the possibility of economically capturing solar energy for heating purposes. Solar heating devices are not totally new, but previously have found little use because of the abundance and low cost of high density fossil fuels. While solar fuel is free, its low energy density requires large collection areas for most applications. For example, 1500 square feet of collection area facing the sun are typically required to fully heat an average home. Consequently, collection equipment costs are high, and most known solar heating systems cannot be justified economically.

Flat plate air heaters are known. The American Society of Heating, Radiation, and Airconditioning Engineers (ASHRAE) shows several designs in a recent chapter on Solar Heating and Cooling of Buildings. The simplest design is a single pane of glass admitting solar energy into a cavity where the incident radiation strikes a black absorbing surface which gets warm. Air moving through the cavity either by natural convection or forced air transfers the collected heat as desired. This inexpensive collector has several shortcomings: first, with just a single pane of glass, the collector loses considerable heat back to a cold outdoor environment, and second, the flat back plate does not provide enough area for effective heat transfer to the moving air stream. To overcome these problems, some solar air heaters have at least two transparent surface sheets, with an airspace therebetween, to minimize collector heat loss. Some solar air heaters have multiple absorbing sheets to increase the area for heat transfer to the moving airstream.

Solar air heaters are typically placed directly on a building surface, either a wall or the roof, facing the sun, with thermal insulation placed between the collectors and the space within the building. Since a large surface area is usually needed for collection, arrays of identical panels are usually used, the panels being fabricated in a size convenient for handling and also for minimizing waste of materials. Currently fabricated panels range in size from 2 feet by 4 feet up to 4 feet by 8 feet. The glass surface of the collector may serve as the weather surface of the building, but otherwise the collector panel is usually structurally redundant. While a plurality of air heating collector arrays have been installed between building framing members to reduce overall system costs, such designs have not been very versatile in permitting variable ductwork locations for air inlets and outlets to the panels.

An additional problem with flat plate heaters concerns their warm weather performance. Economical equipment is not yet available for using the sun's heat to drive absorption cycle airconditioning equipment, so it is necessary to reject captured or incident solar energy during the summer. Heat will build up rapidly in the air heating panel when air is not flowing, and some of the heat will be transferred through the insulation to indoor spaces, which is obviously an undesirable situation in the summer. Overheating can also damage construction materials and possibly even create a danger of a fire. Current techniques for preventing overheating include shading the collectors and ventilating the air cavities to the outdoors. Both of these approaches increase system costs.

Flat plate collectors (large glass-surfaced panels no more than 6–7 inches thick) are generally known for use as solar energy collectors. Concentrating collectors are capable of generating higher temperatures than flat plate collectors, but the latter reach adequate temperatures for space heating, are less expensive to build, and need not "track" the sun. Either air or a liquid (usually water) may be used to transfer heat from a flat plate collector to a storage medium or heated space. While water is generally a more effective heat transfer medium than air, solar water heaters are more expensive to build than solar air heaters since the liquid must be contained in a flow network in close contact with an absorbing surface. Also, the water heater faces maintenance problems with respect to leakage and freeze damage. Costs and reliability currently favor the air heater for space heating applications.

U.S. Pat. No. 3,863,621 discloses a solar wall system which includes two transparent glass or plastic sheets behind which is mounted one or more collector plates for absorption of the sun's rays, and the heat absorbed by the collector plate is then transferred to air passing in the space behind the collector plate. That patent discloses one embodiment wherein the absorptive collector plate is a louvered plate which presents more of its surface area to the sun's rays for absorption of solar energy.

U.S. Pat. No. 2,544,474 shows a solar water heater with water flow through a parallel array of flattened tubes similar to louvers; the entire array rotates to maintain the flattened surface perpendicular to the solar rays and the tube surfaces are flat black to absorb solar energy. As absorbers, the flattened tubes also radiate considerable energy back through the glass, reducing collector efficiency.

Solar rays strike the earth at a lower angle in winter than in summer. U.S. Pat. No. 2,625,930 shows a roof top collector system designed to admit low angle radiation into a collection area, yet reflect high angle radiation from the roof surface. U.S. Pat. No. 2,918,709, utilizes louvered slats in a window which may be oriented to admit radiation or reversed to reflect radiation. But there is no structure in the prior art which utilizes a selectively reflective and admissive geometry within a solar energy collector cavity.

BRIEF SUMMARY OF THE INVENTION

It is, therefore, an object of this invention to provide a solar air heater which overcomes the above-noted disadvantages.

It is another object of this invention to provide a solar air heater which may be installed between structural framing members yet permit variable duct inlet and outlet configurations.

It is another object of this invention to provide a solar air heater which may be quickly preassembled for rapid installation at the construction site.

It is another object of this invention to provide a solar air heater which minimizes heat gain during hot ambient weather conditions.

These objects and others are accomplished in accordance with this invention by providing a flat plate solar collector for installation between light frame structural members, which comprises a pan of sheet stock such as sheet metal with one or more substantially transparent surface sheets to admit solar radiation into a sealed chamber between said pan and the transparent surface sheets. A louvered structure placed behind the transparent surface sheets reflects high angle solar rays yet admits all low angle rays into the radiation absorbing chamber. The louvered structure also increases heat transfer to a moving airstream within the collector. Inlet and outlet ends of the panel may be chamfered or otherwise adapted to permit alternative ductwork connections.

It is another object of this invention to provide a solar air heater which uses selectively reflective and admissive geometry and materials with a solar collector cavity to differentially admit and absorb more solar energy in the winter months than in the summer months.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DETAILED DESCRIPTION OF THE PREFERRED EMBODIMENTS

Figure 1:
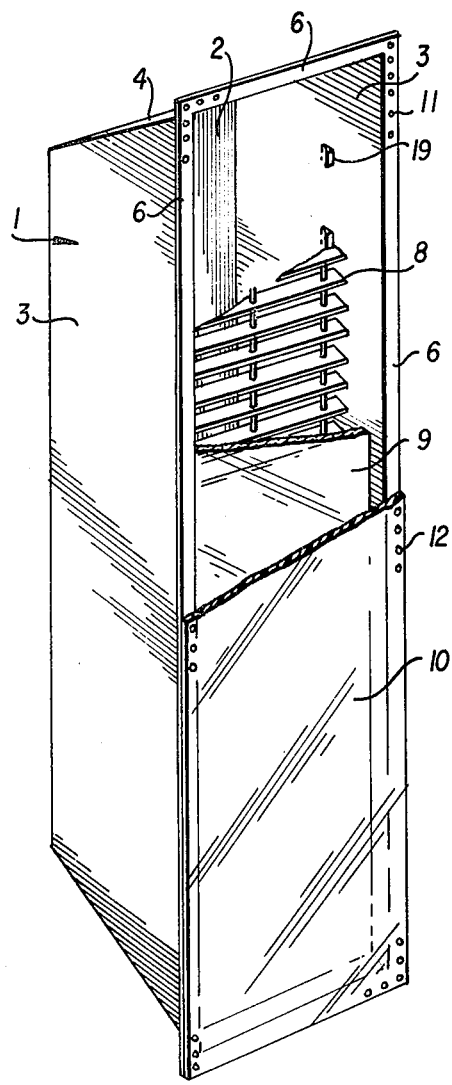
FIG. 1 is a partially schematic, partially cut-away isometric view of a preferred embodiment of the louvered collector designed for location between vertical structural members in a frame wall construction.

The partially cutaway isometric view of FIG. 1 shows the basic elements of a preferred embodiment of the louvered flat plate collector of the present invention. The basic structure of the collector is pan 1, constructed from a flat sheet material such as sheet metal with long sides 3 which are typically bent at right angles to the essentially planar ban bottom 2. Short sides 4 (normally oriented as top and bottom) are here illustrated as bent at about 45° from the plane of the pan bottom 2 for reasons described in conjunction with FIGS. 2 and 3. The typical depth of the pan 1 is somewhat exaggerated in the drawing FIG. 1 in order to more clearly illustrate the relationships of the various parts of the system. Intersections of sides 3 and 4 may be overlapped, and spotwelded, screwed or otherwise connected together, then taped with a fabric duct tape to make the system airtight. Narrow sides 4 are penetrated with holes 5 for inlet and outlet connections. All four sides may have outwardly bent flanges 6 for connection to structural members of a building. The pans as described may be constructed of sheets of steel, aluminum, or copper, but steel is presently preferred because of its greater strength and lower cost. 22 gauge steel is presently particularly appropriate for a preferred embodiment. The inner pan surfaces have a black coating (usually flat black paint) to absorb incident solar radiation. Dimensionally, the pans are sized to fit between parallel structural members located in standard modular spacing patterns. In a preferred embodiment, about 1 ½ thick wood studs placed about 24 inches apart on center leave about 22 ½ inch wide spaces therebetween. Pans about 22 ¼ inches wide are recommended for this spacing to allow about ¼ inch for tolerance errors. About ¾ inch wide flanges 6 make overall collector width about 23 ¾ inches. For wall applications, collector height typically corresponds to total wall height. For about 8 foot ceilings, pan height including flanges becomes about 94 ¾ inches.

Louvered structure or sheet 8 included between the pan bottom 2 and substantially transparent surface sheets 9 and 10 provides the seasonally selective performance of the collector. Its characteristics are more fully described in conjunction with FIG. 2.

Transparent sheets 9 and 10 may be either glass or a transparent plastic material such as Rohm and Haas "plexiglas". Glass is somewhat lower in cost, but is heavier and more subject to breakage. Also, glass cannot easily be drilled for penetration by fasteners, making it more difficult to hold in place. A preferred embodiment of the louvered collector uses damage resistant clear acrylic sheet as the weather surface 10, and less expensive glass for the rear sheet 9. Aligned holes 11 in the pan flanges 6 and 12 in the acrylic sheet 10 are regularly spaced around the perimeter for screws or other fasteners to be driven into the structural members. Recommended fastener spacing is about 12 inches on center on the structural members.

Figure 2:
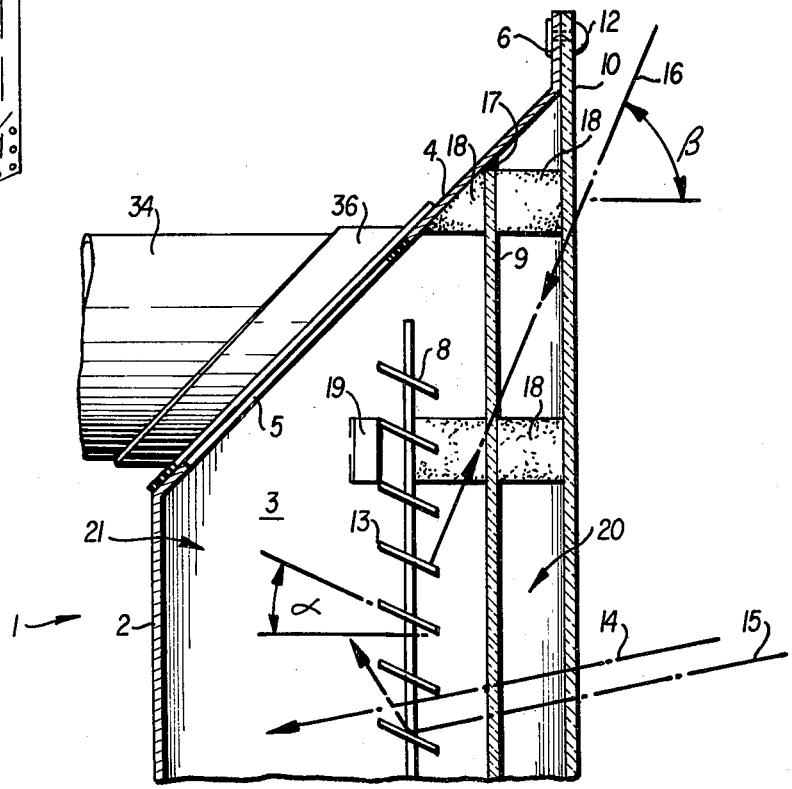
FIG. 2 is an enlarged, partially schematic, vertical cross-sectional view of the top of a louvered flat plate collector like that shown in FIG. 1, showing the reflection geometry of the louvers.

The enlarged cross-sectional view of FIG. 2 shows details of assembly at the top portion of the collector as well as the reflection geometry of the louver system. The louver sheet 8 is held in place with angle clips 19 spotwelded or otherwise attached to pan sides 3. Rubber tabs 18 made for example of dense neoprene, are adhered to pan sides 3 to space glass sheet 9 between louver sheet 8 and acrylic sheet 10, giving soft support to prevent glass breakage. Latex or butyl caulk 17 may be applied continuously around the glass edge to create a tight seal between air flow cavity 21 and insulating chamber 20 which is between the two transparent sheets. For maximum insulating value, chamber 20 should be about ⅜ to about ½ inch thick. Overall pan depth or thickness is typically about 3 ½ inches, leaving an air flow cavity 21 slightly less than about 3 inches thick. Within the airflow cavity, the center plane of the louver sheet 8 is displaced toward the outside of the panel, and is preferably located about ¾ to about 1 inch behind glass sheet 9. In this location most of the air flow occurs in the absorbing portion of the chamber, between pan surface 2 and the louver sheet 8.

The louver surfaces are designed to reflect high angle rays 16 occurring in the summer or hot months, yet permit low angle rays 14 and 15 either to pass directly through the louver sheet as illustrated by ray 14 or be reflected from the upper surface of louver strip 13 onto the rear absorbing surface as illustrated by ray 15. The reflective upper surfaces of the louver strips 13 may comprise any highly light and heat reflective material such as polished bare metal such as steel or aluminum, an aluminum coating, a silvered mirror coating or any other suitable reflective surface. The under sides of louver strips 13 may be either reflective or absorbing (i.e. either shiny or black). Reflective undersides cause more solar energy to be reflected onto the absorbing rear pan surface, and result in lower temperatures on the louvers. Absorbing undersides will result in higher louver temperatures, hence better heat transfer to the air flow through the chamber. For this reason, absorbing louver undersides are preferred.

From the above discussion it will be appreciated that the performance of the louvers depends more on the relationship between louver angle and incident radiation angle than on louver depth and spacing. While the louvers may be individual strips as wide as about two inches individually fastened to the pan edges, it is usually more economical to produce the louvers from a single sheet as typified by heat register manufacturing. Long parallel slits extend nearly across, but not to the edges of, a metal sheet, with louvers then bent to the desired angle while remaining interconnected at the edges of the sheet. With this production approach, depth of the louver strip must be equal to the spacing between strips. For this geometry, reflective characteristics are virtually independent of louver strip spacing. For an incoming ray at angle $\beta$ from the horizontal, striking a louver pattern at an opposed angle $\alpha$ from the horizontal, all incident radiation is reflected when angle $\beta$ is greater than $(90°\alpha)$, and all radiation is admitted to the absorbing chamber when $\beta$ is less than $(90-2\alpha)°$. In between, the percentage of incident energy reflected may be computed from the formula:

$$\% \text{ reflected} = \frac{1 - \frac{\tan(90-\alpha-\beta)}{\tan \alpha}}{1 + \frac{\tan(90-\alpha-\beta)}{\tan \alpha}}$$

Since the angle of incoming solar rays varies with latitude, time of day, and time of year, a mathematical integration process may be used to determine total solar energy capture performance of the inventive system. A digital computer has been used for this purpose, and results indicate that at 40° north latitude, preferred angle $\alpha$ of 25° will admit substantially all radiation from Oct. 19 to Feb. 23, and will reflect a maximum of 47% of incident radiation on the longest day of the year, June 21.

The above formula is correct for any parallel slat geometry in which:

$$s \geq h \sin\alpha$$

wherein $s$ is the slant length of the slat and $h$ is the spacing between slats. For the preferred angle $\alpha$ of 25°, and for the $s/h$ ratio of 1 resulting from the convenient production method described, more than twice the slant length required for reflection geometry is provided. Other manufacturing techniques may be used to reduce this excess material, or it may be left to increase heat transfer surface area.

It will also be appreciated that the presence of the louvered sheet tends to reduce the loss of energy radiated from the absorbing surface. The greater the louver angle $\alpha$, the less reradiated energy is lost from the chamber, according to the relationship (for slant length equal to spacing):

% reradiated energy lost = $1 - \sin \alpha$.

For the 25° louver angle, about 42% of the reradiated energy is captured by louvers.

From the above discussion it is apparent that the performance of the louvered collector could be further improved if louver angle were variable. However, production costs for an adjustable louver arrangement would be high, since individual slats with a connecting linkage would be required and a manual or automatic control mechanism would be needed as well. The cost of such additional features does not presently appear to be justified by the potential return of being able to completely block sunlight in the summer.

Figure 3:
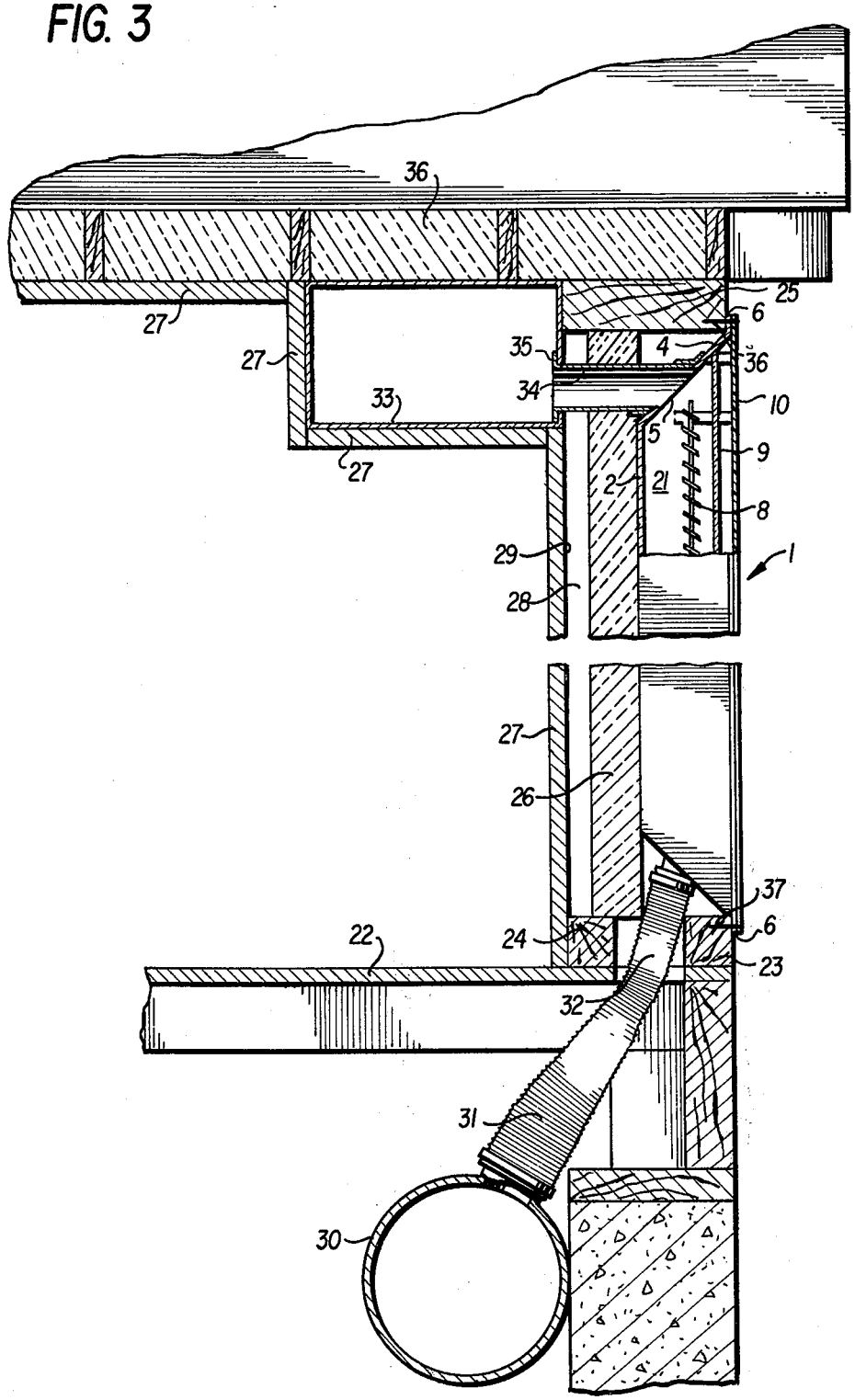
FIG. 3 is a partially schematic, partially cut-away vertical cross-sectional view of the louvered collector installed within a wood frame building structure, showing air supply and return ductwork.

FIG. 3 shows a partially cutaway, sectional view of the louvered collector installed in a wall of wood 2 × 6 construction. The structure consists of floor framing surfaced with plywood subfloor 22. The vertical 2 × 6 studs are spaced about 24 inches on the center and rest on 2 inch × 2 inch sill plates 23 and 24 spaced about 2 ½ inches apart. A 2 inch × 6 inch top plate 25 is attached atop the studs and supports the floor or roof structure above. The fully assembled collector pan 1 is fastened through flanges 6 to the wood structural members. About 1 ½ inch thick rigid insulation 26 may be preadhered to the back of pan 1 to generate additional insulating airspace 28 between the rigid insulation 26 and interior surface panel 27 (usually gypsum wallboard) fastened to the inside of the wood framing members. A layer of reflective aluminum foil 29 may be used to further improve the insulating value of the wall.

FIG. 3 demonstrates the advantages of the sloping pan ends 4. Ductwork serving the collector may be channeled either vertically, as shown by flexible duct 31 inserted through duct opening 5, or horizontally, as shown by sheet metal boot 34 inserted through top duct opening 5, or at an intermediate angle if desired. Because it is desirable to locate duct work within heated spaces, the configuration shown in FIG. 3 could be used in many applications of the present invention. Cooler air flowing into the collectors enters from the bottom to take advantage of the upward gravity flow as the air is warmed by the sun. In many cases the air inlet ductwork is too large to be placed at the wall-floor joint within the room, as can be done at the ceiling where it does not interfere with furniture placement and occupant activities in the room. Thus, the supply duct must be placed below the floor. Round duct 30 supplies an array of panels each with its own flexible inlet duct 31. To keep the air return duct 33 below insulated ceiling 36, boot 34 is run substantially horizontally into the return duct which is surfaced with gypsum board 27. Boot 34 may be equipped with flanges 35 and 36 for connecting with sheet metal screws to the return duct and the collector panel, respectively.

It will be appreciated that for other constructions, different air inlet and outlet systems may be used. For example, a typical two-story collector wall would have a vertical boot from the top of the first floor collector into the bottom of the second floor collector, so that the two could be connected in series. It will also be appreciated that the invention disclosed here may easily be adapted for panel placement atop sloped roofs, with louver angles varied to provide the proper ratio or reflected energy as the seasons change.

The louvered flat plate collector as disclosed clearly satisfies the stated objectives of providing an economical solar heating panel which reduces costs by its ease of installation within a light frame wall, by using a maintenance free fixed louver geometry to capture solar energy on a seasonally selective basis, and having inlet-outlet ports located to maximize duct location alternatives.

Although specific components, proportions and arrangements of elements have been stated in the above description of preferred embodiments of this invention, other equivalent components and arrangements of elements may be used with satisfactory results and various degrees of quality, or other modifications may be made herein to synergize or enhance the construction of the invention to thereby increase its utility. It will be understood that such changes of details, materials, arrangements of parts, and uses of the invention described and illustrated herein, are intended to be included within the principles and scope of the claimed invention.

What is claimed is:

1. An apparatus for heating air by solar heat, comprising:

an enclosed air cavity having an inlet for admitting air thereto, and an outlet for conducting air therefrom;

an outer transparent sheet which comprises an exterior wall of said cavity, which exterior wall is for transmission of solar energy, an inner transparent sheet for transmission of solar energy spaced adjacent said outer transparent sheet and being substantially coextensive with said outer transparent sheet, the edges of said outer and inner transparent sheets being sealed together to isolate a volume of air therebetween, a plurality of louvers comprising thin, substantially parallel slats, arranged with their centerlines in a plane which is located within said enclosed air cavity and adjacent the inner transparent sheet, each of said slats having an upper surface which is highly reflective of solar energy, said slats being selectively angled for reflecting solar rays impinging thereon at high angles from the horizontal, and for permitting lower angle solar rays to pass therebetween;

the interior surface of said cavity being highly absorptive of solar energy.

2. The apparatus of claim 1, wherein said louver slats are each oriented at an angle of about 25° to the horizontal with the upper surface of said slats being more prominent on the exterior of the apparatus.

3. The apparatus of claim 2, wherein the lower surfaces of said louver slats are highly absorptive of solar energy.

4. The apparatus of claim 2, wherein said inlet and outlet are respectively located in a lower end of said chamber and in an upper end of said chamber.

5. The apparatus of claim 4, wherein said ends of the chamber are inclined to the planes of the transparent sheets, for facilitating connection of conduits to said inlet and outlet.

* * * * *